United States Patent
Lee

(10) Patent No.: US 9,151,625 B2
(45) Date of Patent: Oct. 6, 2015

(54) APPARATUS FOR CONTROLLING COMPLEMENTING POSITION OF VEHICLE, AND SYSTEM AND METHOD FOR COMPLEMENTING POSITION OF VEHICLE WITH THE SAID APPARATUS

(71) Applicant: HYUNDAI MOBIS CO., LTD., Seoul (KR)

(72) Inventor: Jeong Hee Lee, Yongin-si (KR)

(73) Assignee: Hyundai Mobis Co., Ltd, Seoul (KR)

( * ) Notice: Subject to any disclaimer, the term of this patent is extended or adjusted under 35 U.S.C. 154(b) by 48 days.

(21) Appl. No.: 14/106,025

(22) Filed: Dec. 13, 2013

(65) Prior Publication Data
US 2015/0149083 A1    May 28, 2015

(30) Foreign Application Priority Data
Nov. 26, 2013  (KR) .................. 10-2013-0144474

(51) Int. Cl.
| | | |
|---|---|---|
| G01C 21/26 | (2006.01) | |
| G01S 19/07 | (2010.01) | |
| G01S 19/41 | (2010.01) | |
| G01S 5/00  | (2006.01) | |
| G08G 1/16  | (2006.01) | |

(52) U.S. Cl.
CPC ............... *G01C 21/26* (2013.01); *G01S 5/009* (2013.01); *G01S 5/0072* (2013.01); *G01S 19/07* (2013.01); *G01S 19/41* (2013.01); *G08G 1/161* (2013.01); *G08G 1/164* (2013.01)

(58) Field of Classification Search
CPC .......... B60R 25/33; G08G 1/20; G08G 1/161; G08G 1/0164; G01S 19/35; G01S 19/07; G01S 19/41; G01S 5/0072; G01S 5/009; G01C 21/20; G01C 21/26
USPC .......................................................... 701/468
See application file for complete search history.

(56) References Cited

U.S. PATENT DOCUMENTS

| | | | |
|---|---|---|---|
| 7,266,477 B2 * | 9/2007 | Foessel ......................... 702/189 |
| 8,326,532 B2 * | 12/2012 | Kmiecik et al. ............... 701/472 |
| 8,798,645 B2 * | 8/2014 | Haney ......................... 455/456.2 |
| 8,983,771 B2 * | 3/2015 | Breed ............................ 701/423 |
| 2003/0146871 A1 * | 8/2003 | Karr et al. ..................... 342/457 |
| 2004/0230373 A1 | 11/2004 | Tzamaloukas |
| 2005/0065711 A1 * | 3/2005 | Dahlgren et al. .............. 701/117 |
| 2006/0293850 A1 * | 12/2006 | Ahn et al. ...................... 701/213 |
| 2007/0063875 A1 * | 3/2007 | Hoffberg .................... 340/995.1 |

(Continued)

FOREIGN PATENT DOCUMENTS

JP    2008-089353    4/2008

OTHER PUBLICATIONS

Extended European Search Report mailed on Apr. 24, 2014 by the European Patent Office in corresponding European Application No. 14150213.8 (7 pages in English).

*Primary Examiner* — Mary Cheung
*Assistant Examiner* — Atul Trivedi
(74) *Attorney, Agent, or Firm* — NSIP Law

(57) ABSTRACT

Disclosed are a system and a method for complementing a position of a vehicle and an apparatus for controlling complementing a position of a vehicle that select a representative vehicle within divided areas and complement a position of an own vehicle from a representative vehicle by using a DGPS complementation signal received through vehicle to vehicle (V2V) communication and vehicle to infrastructure (V2I) communication.

19 Claims, 8 Drawing Sheets

(56) References Cited

U.S. PATENT DOCUMENTS

| | | | |
|---|---|---|---|
| 2008/0215231 A1* | 9/2008 | Breed | 701/117 |
| 2011/0106442 A1* | 5/2011 | Desai et al. | 701/208 |
| 2013/0093618 A1 | 4/2013 | Oh et al. | |
| 2013/0116908 A1 | 5/2013 | Oh et al. | |

* cited by examiner

APPARATUS FOR CONTROLLING COMPLEMENTING POSITION OF VEHICLE, AND SYSTEM AND METHOD FOR COMPLEMENTING POSITION OF VEHICLE WITH THE SAID APPARATUS

CROSS-REFERENCE TO RELATED APPLICATIONS

This application claims priority to and the benefit of Korean Patent Application No. 10-2013-0144474 filed in the Korean Intellectual Property Office on Nov. 26, 2013, the entire contents of which are incorporated herein by reference.

TECHNICAL FIELD

The present invention relates to a system and a method for complementing a GPS signal received by a vehicle, and also relates to an apparatus for controlling complementing a GPS signal received by a vehicle.

BACKGROUND ART

A global positioning system (GPS) called satellite navigation equipment or a satellite locating system, which is a locating technology globally used, is one of the locating systems having the highest precision among locating systems which have been developed up to now.

However, in general, an error range in positioning using the GPS is 5 to 15 m and since an error of up to 30 m may be shown, performance required in general vehicle safety technology cannot be satisfied.

By considering such a point, a differential global positioning system (DGPS) is widely used in a vehicle safety technology field.

The DGPS as a GPS measurement technique of a relative positioning type complements elements that cause an error by using a reference point coordinate which has been already known and acquires more accurate positional information by maximally reducing the error.

However, since the DGPS has a limitation in that a service providing area is restricted by coverage of a base station and a position where a commercial DGPS complementation signal is serviced is too distant from the base station, positional accuracy cannot be enhanced even though the DGPS is used.

Japanese Patent Application Laid-Open No. 2008-089353 discloses a system for complementing a GPS signal of an own vehicle by receiving a DGPS signal from a road-side unit (RSU). However, this system has a problem in that traffic is significantly increased because all vehicles directly receive the DGPS signal from the road-side unit.

SUMMARY OF THE INVENTION

The present invention has been made in an effort to provide a system and a method for complementing a position of a vehicle and an apparatus for controlling complementing a position of a vehicle that select a representative vehicle within divided areas and complement a position of an own vehicle from a representative vehicle by using a DGPS complementation signal received through vehicle to vehicle (V2V) communication and vehicle to infrastructure (V2I) communication.

An exemplary embodiment of the present invention provides an apparatus for controlling complementing a position of a vehicle, including: a representative vehicle deciding unit configured to decide a representative vehicle among vehicles positioned in each small area; and a data transmission controlling unit configured to first control a DGPS complementation value to be transmitted to the representative vehicle and thereafter, control the DGPS complementation value to be transmitted to the remaining vehicles in the same area from the representative vehicle.

The apparatus may further include an area dividing unit configured to divide a large area into small areas according to a predetermined criterion.

The area dividing unit may use a communicatable distance between two vehicles or coverage of a base station as the criterion.

The area dividing unit uses the representative vehicle as one of the two vehicles at the time of using the communicatable distance between two vehicles as the criterion.

The representative vehicle deciding unit may first decide the representative vehicle and a candidate vehicle and again decide the representative vehicle or the candidate vehicle depending on whether the representative vehicle or the candidate vehicle deviates from the small area.

The representative vehicle deciding unit may change the candidate vehicle to the representative vehicle and decides a vehicle that has entered the small area most recently as the candidate vehicle when the representative vehicle deviates from the small area and decide the vehicle that has entered the small area most recently as the candidate vehicle when the candidate vehicle deviates from the small area.

Another exemplary embodiment of the present invention provides a system for complementing a position of a vehicle including: a vehicle position complementation controlling apparatus configured to include an area dividing unit configured to divide a large area into small areas according to a predetermined criterion, a representative vehicle deciding unit configured to decide a first representative vehicle among vehicles positioned in each small area, and a data transmission controlling unit configured to first control a DGPS complementation value to be transmitted to the first representative vehicle and thereafter, control the DGPS complementation value to be transmitted to the remaining vehicles in the same area from the first representative vehicle; a first representative vehicle configured to receive the DGPS complementation value from a second representative vehicle positioned in a base station or another small area and complement a position thereof based on the DGPS complementation value; and the remaining vehicles configured to complement positions thereof based on the DGPS complementation value received from the first representative vehicle.

The system may further include an area dividing unit configured to divide a large area into small areas according to a predetermined criterion.

The first representative vehicle may receive the DGPS complementation value and information on a time when the DGPS complementation value is generated, select a DGPS complementation value which is generated most recently based on the time information when at least two DGPS complementation values are received, and complement a position thereof based on the selected DGPS complementation value.

The remaining vehicles may receive identification information together with the DGPS complementation value, determine whether the DGPS complementation value is received from a representative vehicle in a small area to which each of the remaining vehicles belongs by using the identification information, and complement positions thereof based on the DGPS complementation value when it is determined that the DGPS complementation value is received from the representative vehicle in the small area to which each of the remaining vehicles belongs.

The identification information may include latitude and longitude information.

The remaining vehicles may receive the DGPS complementation value and information on a time when the DGPS complementation value is generated, select a DGPS complementation value which is generated most recently based on the time information when at least two DGPS complementation values are received from the representative vehicle in the small area to which each of the remaining vehicles belongs, and complement positions thereof based on the selected DGPS complementation value.

The DGPS complementation value may be generated by the base station.

Yet another exemplary embodiment of the present invention provides a method for complementing a position of a vehicle, including: representative vehicle deciding of deciding, by a vehicle position complementation controlling apparatus, a first representative vehicle among vehicles positioned in each small area; first position complementing of receiving, by the first representative vehicle, the DGPS complementation value from a second representative vehicle positioned in a base station or another small area and complementing a position thereof based on the DGPS complementation value; and second position complementing of complementing, by the remaining vehicles positioned in the same small area as the first representative vehicle, positions thereof based on the DGPS complementation value received from the first representative vehicle.

The method may further include dividing, by the vehicle position complementation controlling apparatus, a large area into small areas according to a predetermined criterion, before the deciding of the representative vehicle.

In the dividing of the area, communicatable distance between two vehicles or coverage of a base station may be used as the criterion.

In the dividing of the area, the representative vehicle may be used as one of the two vehicles at the time of using the communicatable distance between two vehicles as the criterion.

In the dividing of the area, the representative vehicle and a candidate vehicle may be first decided and the representative vehicle or the candidate vehicle may be decided again depending on whether the representative vehicle or the candidate vehicle deviates from the small area.

In the deciding of the representative vehicle, the candidate vehicle may be changed to the representative vehicle and a vehicle that has entered the small area most recently may be decided as the candidate vehicle when the representative vehicle deviates from the small area and the vehicle that has entered the small area most recently may be decided as the candidate vehicle when the candidate vehicle deviates from the small area.

In the first position complementing, the DGPS complementation value and information on a time when the DGPS complementation value may be generated, a DGPS complementation value which is generated most recently may be selected based on the time information when at least two DGPS complementation values are received, and a position thereof may be complemented based on the selected DGPS complementation value.

In the second position complementing, identification information may be received together with the DGPS complementation value, it may be determined whether the DGPS complementation value is received from a representative vehicle in a small area to which each of the remaining vehicles belongs by using the identification information, and positions thereof may be complemented based on the DGPS complementation value when it is determined that the DGPS complementation value is received from the representative vehicle in the small area to which each of the remaining vehicles belongs.

In the second position complementing, the DGPS complementation value and information on a time when the DGPS complementation value may be generated, a DGPS complementation value which is generated most recently may be selected based on the time information when at least two DGPS complementation values are received from the representative vehicle in the small area to which each of the remaining vehicles belongs, and positions thereof may be complemented based on the selected DGPS complementation value.

According to exemplary embodiments of the present invention, the following effects can be obtained by selecting a representative vehicle within divided areas and complementing a position of an own vehicle from a representative vehicle by using a DGPS complementation signal received through vehicle to vehicle (V2V) communication and vehicle to infrastructure (V2I) communication.

First, traffic can be significantly reduced.

Second, accuracy of a satellite navigation signal received in the existing GPS can be improved.

Third, stability can be secured by preventing a phenomenon in which a DGPS complementation signal is cut off through selection of a representative vehicle.

The foregoing summary is illustrative only and is not intended to be in any way limiting. In addition to the illustrative aspects, embodiments, and features described above, further aspects, embodiments, and features will become apparent by reference to the drawings and the following detailed description.

Figure 1:
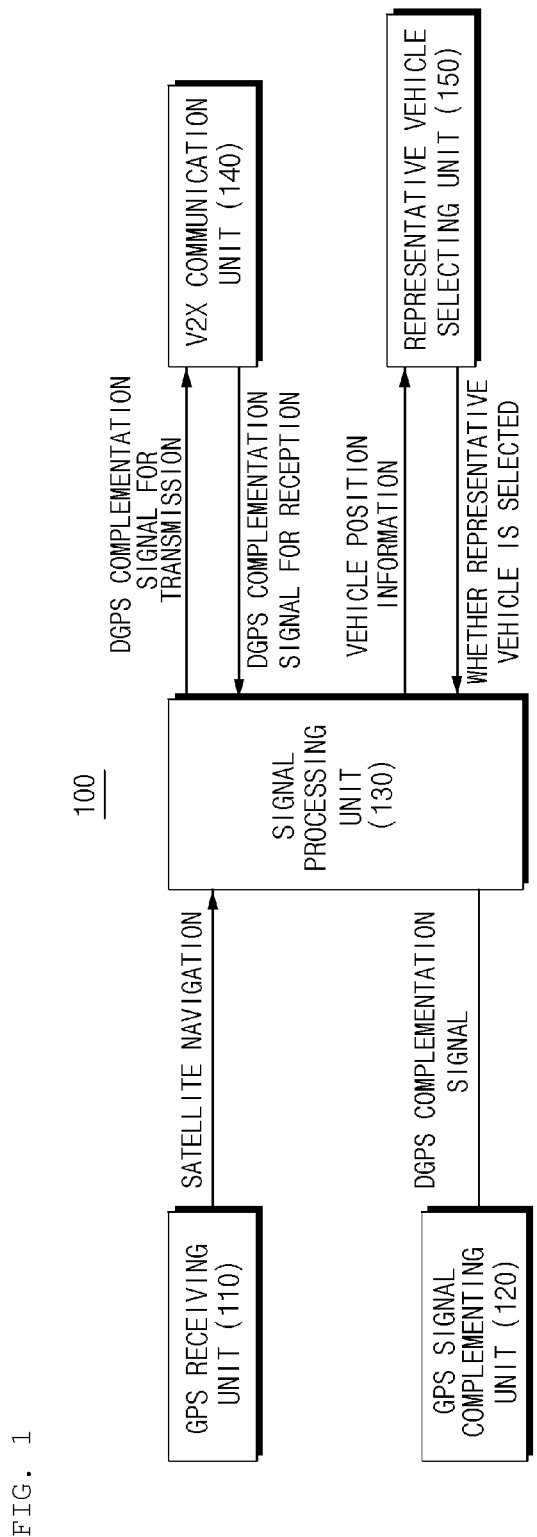
FIG. 1 is a conceptual diagram of a system for complementing a satellite navigation signal according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter, exemplary embodiments of the present invention will be described in detail with reference to the accompanying drawings.

The present invention relates to a method for enhancing accuracy of a satellite navigation signal (GPS signal) by using vehicle to vehicle communication, in which by using a method in which a representative vehicle among vehicles that travel within divided areas receives a DGPS complementation signal generated from a road-side unit and retransmits the received DGPS complementation signal, traffic is significantly reduced as compared with the related art, and vehicles in an area distant from the road-side unit also receive a DGPS complementation signal which is subjected to a smaller number of steps than a method in the related art, and as a result, the accuracy can be improved. Stability can be secured by preventing a phenomenon in which a DGPS complementation signal is cut off through a selection method of a representative vehicle.

Hereinafter, the present invention will be described in more detail with reference to the accompanying drawings.

FIG. 1 is a conceptual diagram of a system for complementing a satellite navigation signal according to an exemplary embodiment of the present invention.

The present invention relates to a method for complementing a satellite navigation signal received by a vehicle and proposes a system for enhancing accuracy of the satellite navigation signal through vehicle to vehicle (V2V) communication and vehicle to infrastructure (V2I) communication by using a DGPS complementation signal generated in a road-side unit installed on the ground. The road-side unit generates and transmits the DGPS complementation signal in real time and an object of the present invention is that a vehicle receives the generated DGPS complementation signal through V2I communication to complement the satellite navigation signal and retransmits the received DGPS complementation signal to a neighboring vehicle through the V2V communication, and as a result, all vehicles can enhance the accuracy of the satellite navigation signal through the DGPS complementation signal.

An object of the present invention is that all areas are divided in a grid pattern in order to reduce traffic caused by the V2V communication and one representative vehicle is selected among vehicles that travel within each divided grid-pattern area to grant a role of transmitting the DGPS complementation signal to only vehicles selected as the representative vehicle and grant only a role of receiving the DGPS complementation signal to the remaining vehicles, thereby decreasing communication load and a signal transmission time.

The present invention, which is a system for complementing a satellite navigation signal under the presumption that a road-side unit generating the DGPS complementation signal is present in a predetermined area and each vehicle is mounted with a V2X communication terminal, is a system that complements the satellite navigation signal by receiving the DGPS complementation signal generated from the road-side unit by each vehicle through the V2V communication.

To this end, first of all, dividing an area with a road into a plurality of areas needs to be performed and the sizes of the divided areas may be set based on a communicatable distance of the V2V communication.

A unique representative vehicle and a candidate representative vehicle are selected in each divided area, and the representative vehicle serves to transmit the DGPS complementation signal within each area and receive the DGPS complementation signal from the representative area in a neighboring area. In regards to the representative vehicle, when a present representative vehicle deviates from the existing area, the present representative vehicle is cancelled from the representative vehicle and the candidate representative vehicle is selected as the representative vehicle and thereafter, a vehicle that enters the area is selected as the candidate representative vehicle. Accordingly, one vehicle that transmits the DGPS complementation signal is distributed in each divided area and the other vehicles receive the DGPS complementation signal from the representative vehicle to complement the satellite navigation signal. A constitution and a flowchart of an entire system will be described below.

Referring to FIG. 1, a satellite navigation signal complementing system 100 includes a GPS receiving unit 110, a GPS signal complementing unit 120, a signal processing unit 130, a V2X communication unit 140, and a representative vehicle selecting unit 150.

The GPS receiving unit 110 serves to receive a satellite navigation signal.

The V2X communication unit 140 serves to transmit and receive a DGPS complementation signal by using V2V communication or V2I communication.

The representative vehicle selecting unit 150 serves to select a representative vehicle within divided areas.

The GPS signal complementing unit 120 serves to complement a GPS signal by using the DGPS complementation signal.

The signal processing unit 130 serves to control all operations of the GPS receiving unit 110, the GPS signal complementing unit 120, the V2X communication unit 140, and the representative vehicle selecting unit 150.

Figure 2:
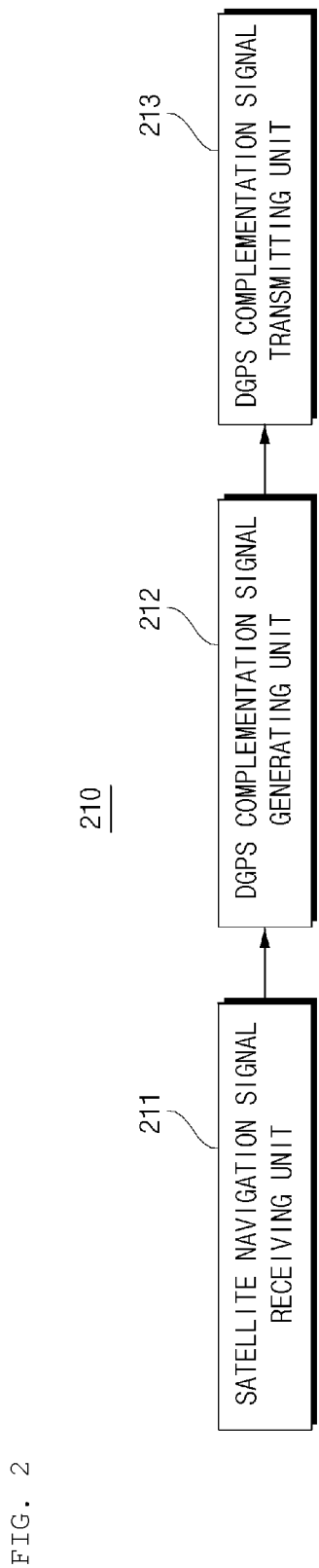
FIG. 2 is a conceptual diagram of a road-side unit according to an exemplary embodiment of the present invention.

FIG. 2 is a conceptual diagram of a road-side unit according to an exemplary embodiment of the present invention. Referring to FIG. 2, a road-side unit 210 includes a satellite navigation signal receiving unit 211, a DGPS complementation signal generating unit 212, and a DGPS complementation signal transmitting unit 213.

The satellite navigation signal receiving unit 211 serves to receive a GPS signal.

The DGPS complementation signal generating unit 212 serves to generate the DGPS complementation signal based on the received GPS signal.

The DGPS complementation signal transmitting unit 213 serves to deliver the generated DGPS complementation signal to the outside.

Next, a method for complementing the satellite navigation signal by using the system 100 of FIG. 1 and the road-side unit 210 of FIG. 2 will be described.

(1) Dividing Area

Dividing the area with the road into areas having a predetermined size is required to adopt the system. For example, when the communicatable distance of the V2X terminal mounted on each vehicle is 500 m, a complementation signal of the representative vehicle is transmitted to a vehicle within a radius of 500 m around the representative vehicle, and as a result, a range (x, the unit thereof is m) of each area needs to be within $x^2=500^2\times500^2$ in order to remove a blind area.

Figure 4:
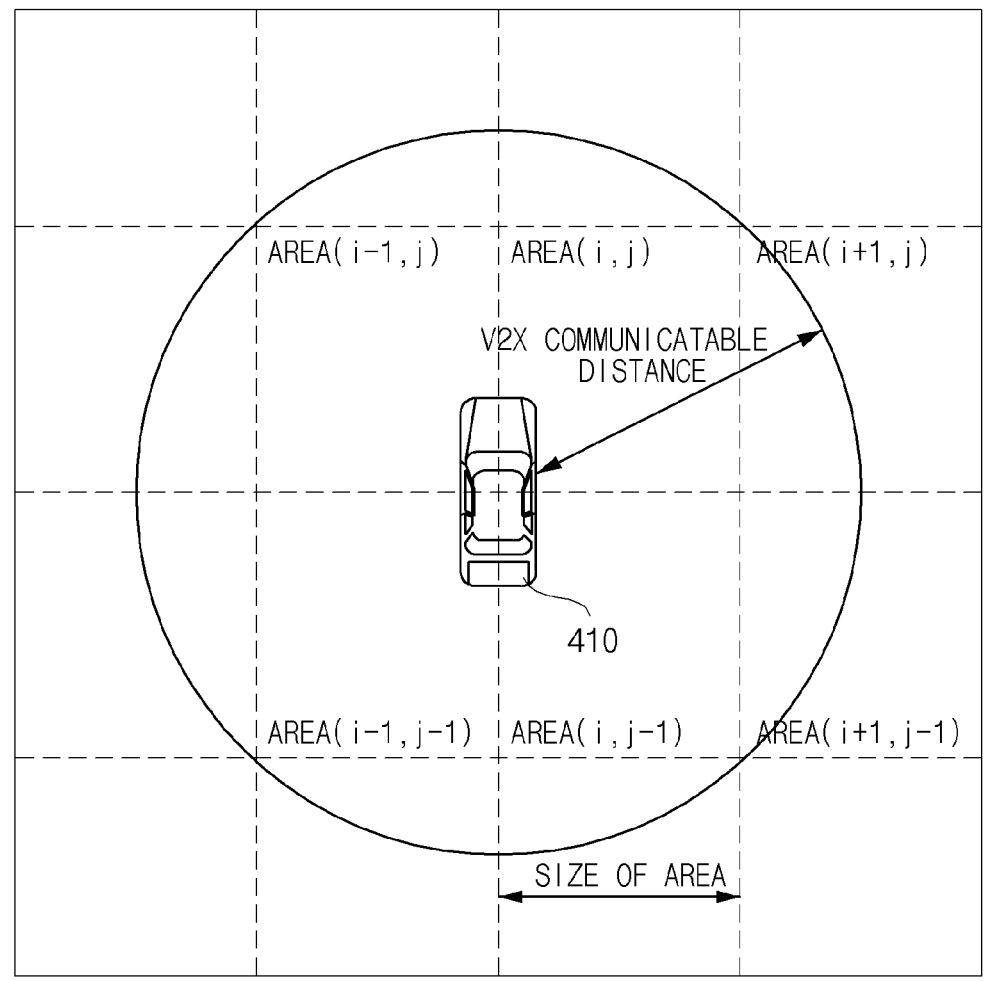
FIG. 4 is a reference diagram for describing a method for dividing an area according to an exemplary embodiment of the present invention.

A unique identifier is granted to each area to transmit the DGPS complementation signal transmitted by the representative vehicle, which includes the identifier of each area. As the unique identifier, latitude and longitude information may be used. FIG. 4 illustrates an example of dividing an area. FIG. 4 is an example of the case of dividing an area around a representative vehicle 410.

(2) Selecting Representative Vehicle and Candidate Representative Vehicle

Figure 5:
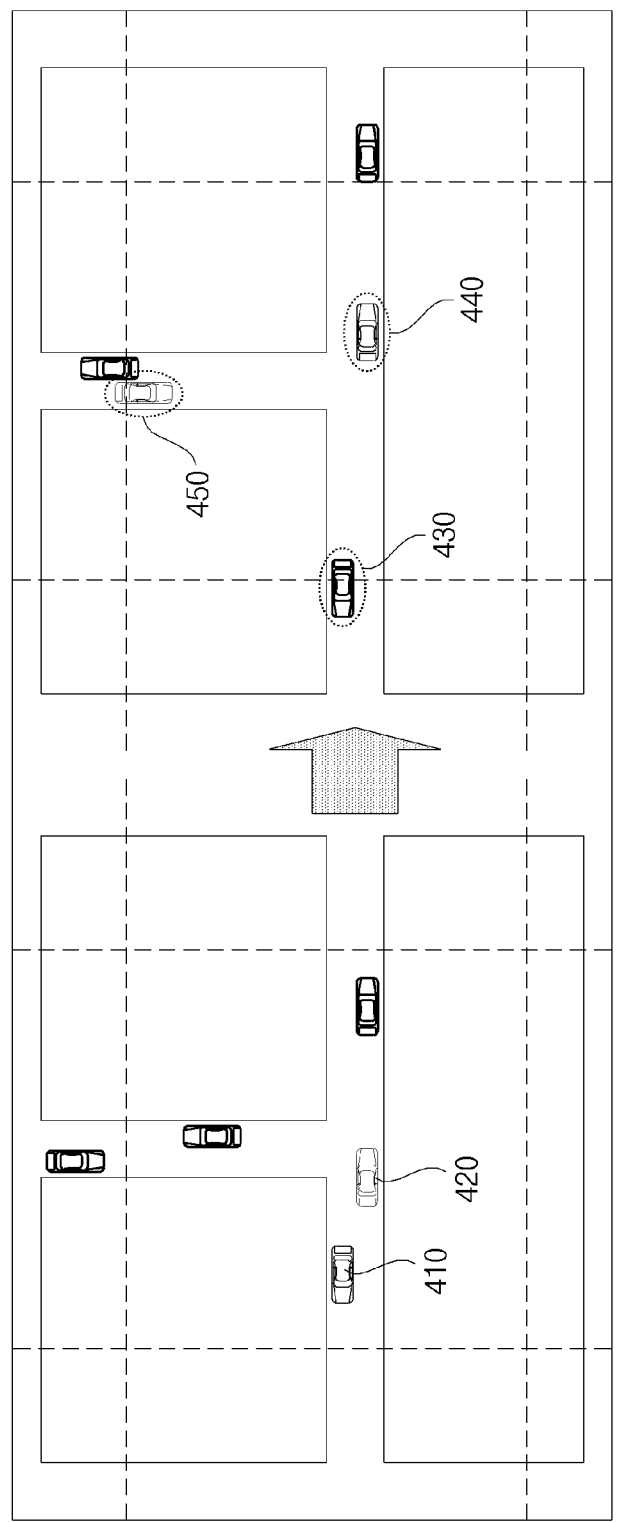
FIG. 5 is a reference diagram for describing a method for selecting a representative vehicle and a candidate representative vehicle according to an exemplary embodiment of the present invention.

FIG. 5 illustrates an example of selecting a representative vehicle and a candidate representative vehicle. One representative vehicle 410 and one candidate representative vehicle 420 are selected within each divided area. When the existing representative vehicle deviates from the area to be cancelled from the representative vehicle (430), the candidate representative vehicle is selected as the representative vehicle at that time (440) and at the time when the candidate representative vehicle is selected as the representative vehicle, a vehicle that first enters the area is selected as the candidate representative vehicle (450). Even when the candidate representative vehicle deviates from the area, a vehicle that first enters the area at that time is selected as the candidate representative vehicle.

(3) Selecting DGPS Complementation Signal

All vehicles that travel on the road receive the satellite navigation signal within an error range. Each vehicle receives the DGPS complementation signal from the road-side unit to complement the satellite navigation signal in order to reduce the error range. According to the present invention, each vehicle receives the DGPS complementation signal from the representative vehicle of each area and a criterion for selecting which area the DGPS complementation signal is received from is required for a representative vehicle of an area distant from the road-side unit. The DGPS complementation signal generated from the road-side unit includes information on a time when the complementation signal is generated, and the DGPS complementation signal transmitted and received by the representative vehicle of each area includes information on an identifier and DGPS complementation of each area and information on a time when the signal is generated, and as a result, each representative vehicle selects a DGPS complementation signal which has been most recently generated at the present time. In the case of vehicles other than the representative vehicle, an identifier of an area to which each vehicle belongs and a received DGPS complementation signal are compared to select a DGPS complementation signal of the corresponding area.

Figure 3:
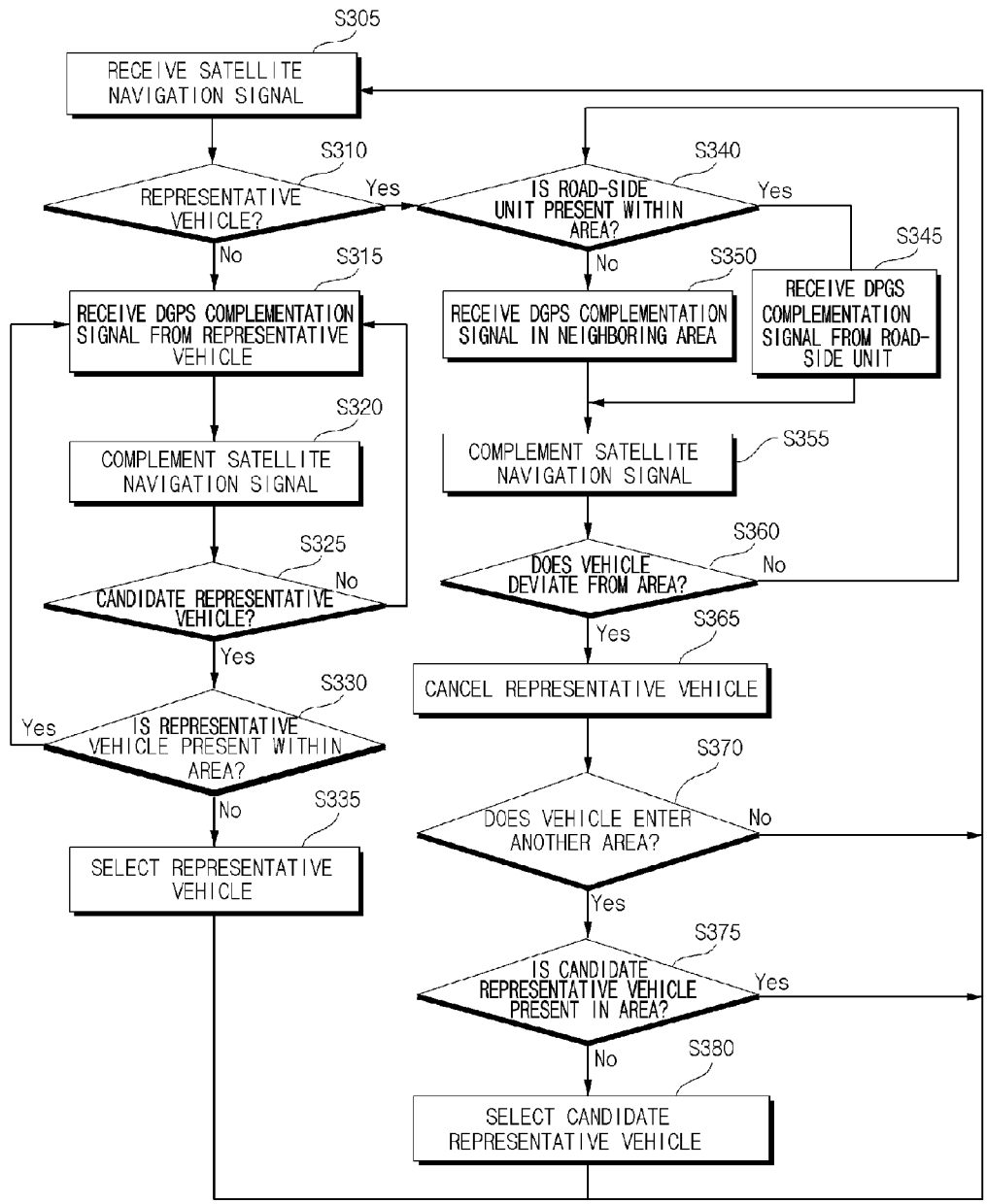
FIG. 3 is a flowchart sequentially illustrating a method for complementing a satellite navigation signal according to an exemplary embodiment of the present invention.

FIG. 3 is a flowchart sequentially illustrating a method for complementing a satellite navigation signal according to an exemplary embodiment of the present invention. The following description will be made with reference to FIG. 3.

First, an own vehicle receives a satellite navigation signal (S305). Thereafter, it is determined whether the own vehicle is a representative vehicle (S310). When it is determined that the own vehicle is not the representative vehicle, a DGPS complementation signal is received from the representative vehicle (S315). Thereafter, the own vehicle complements the satellite navigation signal received thereby based on the DGPS complementation signal (S320). Thereafter, it is determined whether the own vehicle is a candidate representative vehicle (S325). When it is determined that the own vehicle is not the candidate representative vehicle, the process returns to step S315.

On the contrary, when it is determined that the own vehicle is the candidate representative vehicle, it is determined whether the representative vehicle is present within an area (S330). When it is determined that the representative vehicle is present within the area, the process returns to step S315. On the contrary, when it is determined that the representative vehicle is not present within the area, the own vehicle is selected as the representative vehicle (S335).

Meanwhile, when it is determined that the own vehicle is the representative vehicle in step, it is determined whether a road-side unit is present within the area (S340). When it is determined that the road-side unit is present within the area, the DGPS complementation signal is received from the road-side unit (S345). On the contrary, when it is determined that the road-side unit is not present within the area, the DGPS complementation signal is received from a representative vehicle in a neighboring area or the road-side unit (S350). Thereafter, the own vehicle complements the satellite navigation signal based on the DGPS complementation signal received in step S345 or step S350 (S355).

Thereafter, it is determined whether the own vehicle deviates from the area (S360). When it is determined that the own vehicle does not deviate from the area, the process returns to step S340. On the contrary, when it is determined that the own vehicle deviates from the area, the own vehicle is cancelled from the representative vehicle (S365). Thereafter, it is determined whether the own vehicle enters another area (S370). When it is determined that the own vehicle does not enter another area, the process returns to step S305.

On the contrary, when it is determined that the own vehicle enters another area, it is determined whether the candidate representative vehicle is present within the area (S375). When it is determined that the candidate representative vehicle is present within the area, the process returns to step S305. On the contrary, when it is determined that the candidate representative vehicle is not present within the area, the candidate representative vehicle is selected within the area (S380).

Hereinabove, the present invention has been described by using the exemplary embodiment with reference to FIGS. 1 to 5. Effects which may be acquired from the present invention will be arranged below.

First, accuracy of the satellite navigation signal received in the existing GPS may be improved.

Second, driving load of a driver may be reduced through receiving accurate positional information.

Third, a function may be implemented only by S/W without adding H/W to the existing vehicle mounted with a navigation and V2X module mounted and parts need not additionally be mounted.

Fourth, fuel consumption may be reduced through path resetting by malfunctioning of a navigation device and the resulting increase and decrease in driving distance.

Fifth, the present invention may be applied to a localization system of an unmanned autonomous driving system.

Sixth, an added value of a finished vehicle product may be improved by adding a function of a navigation system and a V2X system.

Figure 6:
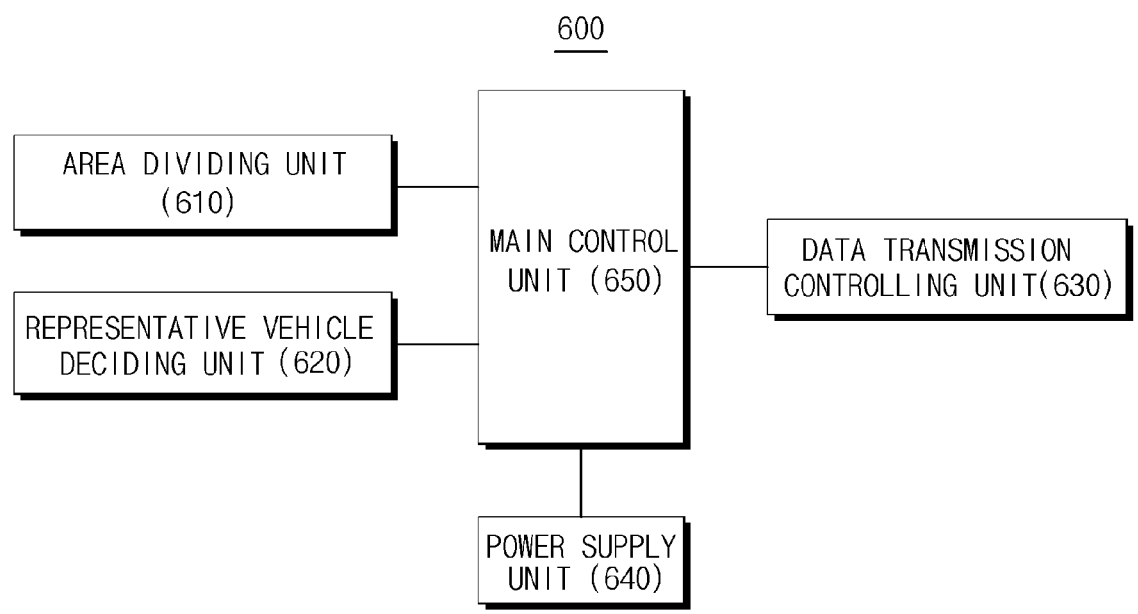
FIG. 6 is a block diagram schematically illustrating an apparatus for controlling complementing a position of a vehicle according to an exemplary embodiment of the present invention.

FIG. 6 is a block diagram schematically illustrating an apparatus for controlling complementing a position of a vehicle according to an exemplary embodiment of the present invention.

Referring to FIG. 6, an apparatus 600 for controlling complementing a position of a vehicle includes a representative vehicle deciding unit 620, a data transmission controlling unit 630, a power supply unit 640, and a main control unit 650. The apparatus 600 for controlling complementing a position of a vehicle may further include an area dividing unit 610.

The power supply unit 640 serves to supply power to the respective components constituting the vehicle position complementation controlling apparatus 600. The main control unit 650 serves to control operations of all of the respective components constituting the vehicle position complementation controlling apparatus 600. Since the vehicle position complementation controlling apparatus 600 may be driven by an ECU within the vehicle or installed in a program type, the power supply unit 640 and the main control unit 650 may not be provided in the exemplary embodiment.

The area dividing unit 610 serves to divide a large area into small areas according to a predetermined criterion.

The area dividing unit 610 may use a communicatable distance between two vehicles or coverage of a base station according to an area division criterion. The area dividing unit 610 may use the representative vehicle as one of two vehicles at the time of using the communicatable distance between two vehicles according to the area division criterion.

The representative vehicle deciding unit 620 serves to decide the representative vehicle among vehicles positioned in the respective small areas.

The representative vehicle deciding unit 620 first decides the representative vehicle and the candidate representative vehicle, and may again decide the representative vehicle and the candidate representative vehicle according to deviation of the representative vehicle and the candidate representative vehicle from the small areas. The representative vehicle deciding unit 620 changes the candidate representative vehicle to the representative vehicle and decides a vehicle that has entered the small area most recently as the candidate vehicle when the representative vehicle deviates from the small area. The representative vehicle deciding unit 620 decides a vehicle that has entered the small area most recently as the candidate vehicle when the candidate vehicle deviates from the small area.

Figure 7:
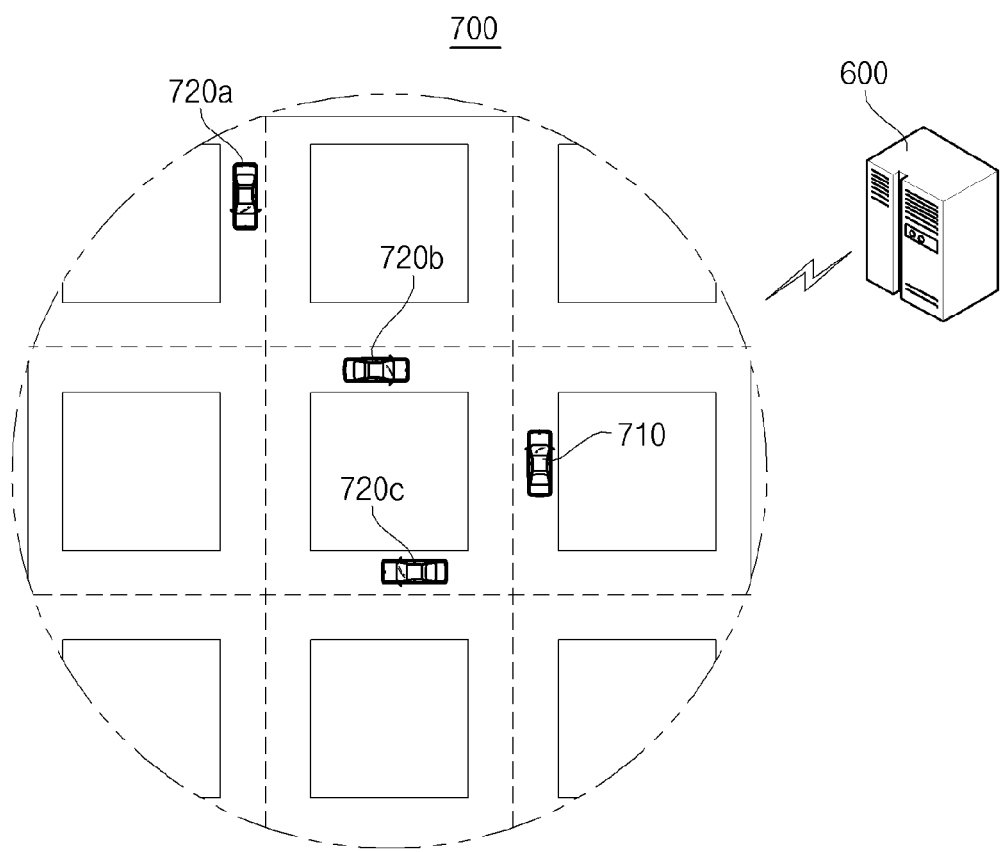
FIG. 7 is a block diagram schematically illustrating a system for complementing a position of a vehicle according to an exemplary embodiment of the present invention.

FIG. 7 is a block diagram schematically illustrating a system for complementing a position of a vehicle according to an exemplary embodiment of the present invention.

Referring to FIG. 7, a vehicle position complementing system 700 includes a vehicle position complementation controlling apparatus 600, a representative vehicle 710, and general vehicles 720a, 720b, and 720c.

Since the vehicle position complementation controlling apparatus 600 has been described above with reference to FIG. 6, a detailed description thereof will be omitted herein. In the exemplary embodiment, the vehicle position complementation controlling apparatus 600 may be implemented in a server or terminal type.

The representative vehicle 710 serves to receive a DGPS complementation value from a base station or a representative vehicle positioned in another small area and complement a position thereof based on the DGPS complementation value. Hereinafter, in order to distinguish the representative vehicle 710 and the representative vehicle positioned in another small area, the former is referred to as a first representative vehicle and the latter is referred to as a second representative vehicle.

The first representative vehicle 710 may receive the DGPS complementation value and information on a time when the DGPS complementation value is generated, select a DGPS complementation value which has been generated most recently based on the time information when at least two DGPS complementation values are received, and complement a position thereof based on the selected DGPS complementation value.

The general vehicles 720a, 720b, and 720c represent the remaining vehicles positioned within the same small area together with the first representative vehicle 710. The general vehicles 720a, 720b, and 720c serve to complement positions thereof based on the DGPS complementation value received from the first representative vehicle 710.

The general vehicles 720a, 720b, and 720c may receive identification information together with the DGPS complementation value, determine whether the DGPS complementation value is received from a representative vehicle in a small area to which each of the general vehicles 720a, 720b, and 720 belongs by using the identification information, and complement positions thereof based on the DGPS complementation value when it is determined that the DGPS complementation value is received from the representative vehicle in the small area to which each of the general vehicles 720a, 720b, and 720 belongs. The identification information includes latitude and longitude information.

The general vehicles 720a, 720b, and 720c may receive the DGPS complementation value and information on a time when the DGPS complementation value is generated, select a DGPS complementation value which is generated most recently based on the time information when at least two DGPS complementation values are received from the representative vehicle in the small area to which each general vehicle belongs, and complement a position thereof based on the selected DGPS complementation value.

Meanwhile, the DGPS complementation value is generated by the base station.

Figure 8:
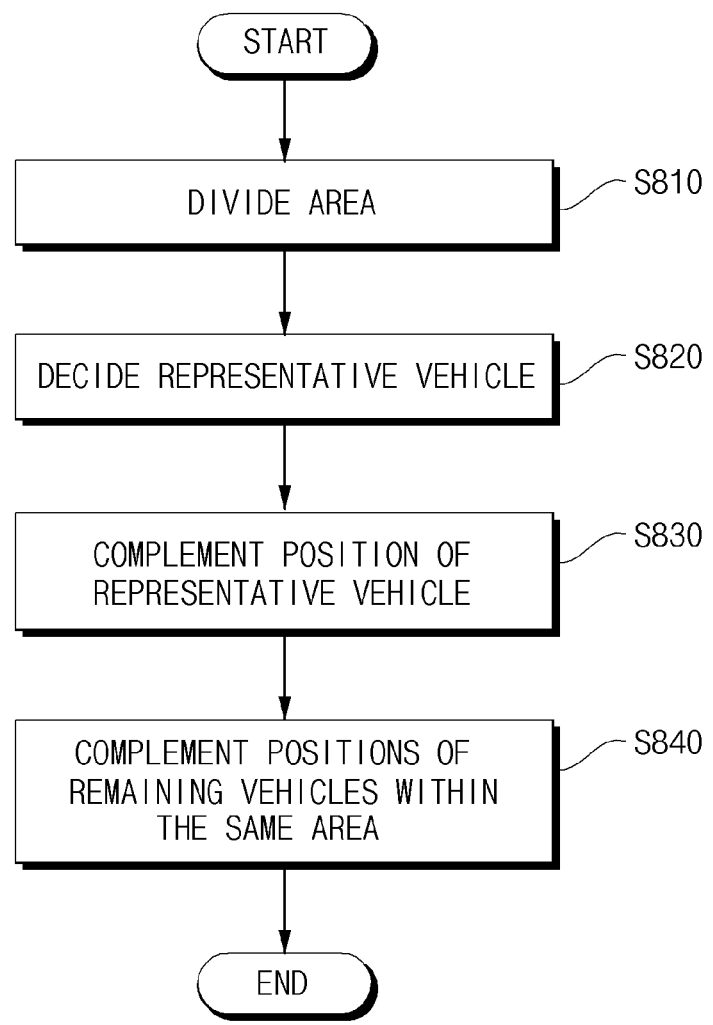
FIG. 8 is a flowchart schematically illustrating a method for complementing a position of a vehicle according to an exemplary embodiment of the present invention.

FIG. 8 is a flowchart schematically illustrating a method for complementing a position of a vehicle according to an exemplary embodiment of the present invention.

First, the vehicle position complementation controlling apparatus divides a large area into small areas according to a predetermined criterion (S810).

Thereafter, the vehicle position complementation controlling apparatus decides a first representative vehicle among vehicles positioned in each small area (S820).

Thereafter, the first representative vehicle receives the DGPS complementation value from a second representative vehicle positioned in a base station or another small area and complement a position thereof based on the DGPS complementation value (S830).

Thereafter, the remaining vehicles positioned in the same small area as the first representative vehicle complement positions thereof based on the DGPS complementation value received from the first representative vehicle (S840).

Meanwhile, the embodiments according to the present invention may be implemented in the form of program instructions that can be executed by computers, and may be recorded in computer readable media. The computer readable media may include program instructions, a data file, a data structure, or a combination thereof. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

As described above, the exemplary embodiments have been described and illustrated in the drawings and the specification. The exemplary embodiments were chosen and described in order to explain certain principles of the invention and their practical application, to thereby enable others skilled in the art to make and utilize various exemplary embodiments of the present invention, as well as various alternatives and modifications thereof. As is evident from the foregoing description, certain aspects of the present invention are not limited by the particular details of the examples illustrated herein, and it is therefore contemplated that other modifications and applications, or equivalents thereof, will occur to those skilled in the art. Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. An apparatus for controlling complementing a position of a vehicle, comprising:
    an area dividing unit configured to divide a large area into small areas according to a predetermined criterion;
    a representative vehicle deciding unit configured to decide a representative vehicle among vehicles positioned in each small area; and
    a data transmission controlling unit configured to, within a same small area as the representative vehicle and remaining vehicles therewithin, first control a DGPS complementation value to be transmitted to the representative vehicle and thereafter, control the DGPS complementation value to be transmitted to the remaining vehicles.

2. The apparatus of claim 1, wherein the area dividing unit uses a communicatable distance between two vehicles or coverage of a base station as the criterion.

3. The apparatus of claim 2, wherein the area dividing unit uses the representative vehicle as one of the two vehicles at the time of using the communicatable distance between two vehicles as the criterion.

4. The apparatus of claim 1, wherein the representative vehicle deciding unit first decides the representative vehicle and a candidate vehicle and again decides the representative vehicle or the candidate vehicle depending on whether the representative vehicle or the candidate vehicle deviates from the small area.

5. The apparatus of claim 4, wherein the representative vehicle deciding unit changes the candidate vehicle to the representative vehicle and decides a vehicle that has entered the small area most recently as the candidate vehicle when the representative vehicle deviates from the small area and decides the vehicle that has entered the small area most recently as the candidate vehicle when the candidate vehicle deviates from the small area.

6. A system for complementing a position of a vehicle, comprising:
    a vehicle position complementation controlling apparatus configured to include an area dividing unit configured to divide a large area into small areas according to a predetermined criterion, a representative vehicle deciding unit configured to decide a first representative vehicle among vehicles positioned in each small area, and a data transmission controlling unit configured to, within a same small area as the representative vehicle and remaining vehicles therewithin, first control a DGPS complementation value to be transmitted to the first representative vehicle and thereafter, control the DGPS complementation value to be transmitted to the remaining vehicles;
    a first representative vehicle configured to receive the DGPS complementation value from a second representative vehicle positioned at a base station or another small area and complement a position thereof based on the DGPS complementation value; and
    the remaining vehicles configured to complement positions thereof based on the DGPS complementation value received from the first representative vehicle.

7. The system of claim 6, wherein the first representative vehicle receives the DGPS complementation value and information on a time when the DGPS complementation value is generated, selects a DGPS complementation value which is generated most recently based on a time information when at least two DGPS complementation values are received, and complements a position thereof based on the selected DGPS complementation value.

8. The system of claim 6, wherein the remaining vehicles receive identification information together with the DGPS complementation value, determine whether the DGPS complementation value is received from a representative vehicle in a small area to which each of the remaining vehicles belongs by using the identification information, and complement positions thereof based on the DGPS complementation value when it is determined that the DGPS complementation value is received from the representative vehicle in the small area to which each of the remaining vehicles belongs.

9. The system of claim 8, wherein the identification information includes latitude and longitude information.

10. The system of claim 8, wherein the remaining vehicles receive the DGPS complementation value and information on a time when the DGPS complementation value is generated, select a DGPS complementation value which is generated most recently based on a time information when at least two DGPS complementation values are received from the representative vehicle in the small area to which each of the remaining vehicles belongs, and complement positions thereof based on the selected DGPS complementation value.

11. The system of claim 6, wherein the DGPS complementation value is generated by the base station.

12. A method for complementing a position of a vehicle, comprising:
    dividing, by a vehicle position complementation controlling apparatus, a large area into small areas according to a predetermined criterion;
    deciding, by the vehicle position complementation controlling apparatus, a first representative vehicle among vehicles positioned in each small area;
    receiving, by the first representative vehicle, the DGPS complementation value from a second representative vehicle positioned at a base station or another small area and complementing a position thereof based on the DGPS complementation value; and
    complementing, by the remaining vehicles positioned in the same small area as the first representative vehicle, positions thereof based on the DGPS complementation value received from the first representative vehicle while the first representative vehicle remains within the same small area.

13. The method of claim 12, wherein in the dividing, by the vehicle position complementation controlling apparatus, a large area into small areas according to a predetermined criterion,
a communicatable distance between two vehicles or coverage of a base station is used as the criterion.

14. The method of claim 13, wherein in the dividing, by the vehicle position complementation controlling apparatus, a large area into small areas according to a predetermined criterion,
the representative vehicle is used as one of the two vehicles at the time of using the communicatable distance between two vehicles as the criterion.

15. The method of claim 12, wherein in the deciding, by the vehicle position complementation controlling apparatus, a first representative vehicle among vehicles positioned in each small area,
the representative vehicle and a candidate vehicle are first decided and the representative vehicle or the candidate vehicle is decided again depending on whether the representative vehicle or the candidate vehicle deviates from the small area.

16. The method of claim 15, wherein in the deciding, by the vehicle position complementation controlling apparatus, a first representative vehicle among vehicles positioned in each small area,
the candidate vehicle is changed to the representative vehicle and a vehicle that has entered the small area most recently is decided as the candidate vehicle when the representative vehicle deviates from the small area and the vehicle that has entered the small area most recently is determined as the candidate vehicle when the candidate vehicle deviates from the small area.

17. The method of claim 12, wherein in the receiving, by the first representative vehicle, the DGPS complementation value from a second representative vehicle positioned in a base station or another small area and complementing a position thereof based on the DGPS complementation value,
the DGPS complementation value and information on a time when the DGPS complementation value is generated are received, a DGPS complementation value which is generated most recently is selected based on a time information when at least two DGPS complementation values are received, and a position thereof is complemented based on the selected DGPS complementation value.

18. The method of claim 12, wherein in the complementing, by the remaining vehicles positioned in the same small area as the first representative vehicle, positions thereof based on the DGPS complementation value received from the first representative vehicle,
identification information is received together with the DGPS complementation value, it is determined whether the DGPS complementation value is received from a representative vehicle in a small area to which each of the remaining vehicles belongs by using the identification information, and positions thereof are complemented based on the DGPS complementation value when it is determined that the DGPS complementation value is received from the representative vehicle in the small area to which each of the remaining vehicles belongs.

19. The method of claim 18, wherein in the complementing, by the remaining vehicles positioned in the same small area as the first representative vehicle, positions thereof based on the DGPS complementation value received from the first representative vehicle,
the DGPS complementation value and information on a time when the DGPS complementation value is generated are received, a DGPS complementation value which is generated most recently is selected based on a time information when at least two DGPS complementation values are received from the representative vehicle in the small area to which each of the remaining vehicles belongs, and positions thereof are complemented based on the selected DGPS complementation value.

* * * * *